Figure 1:
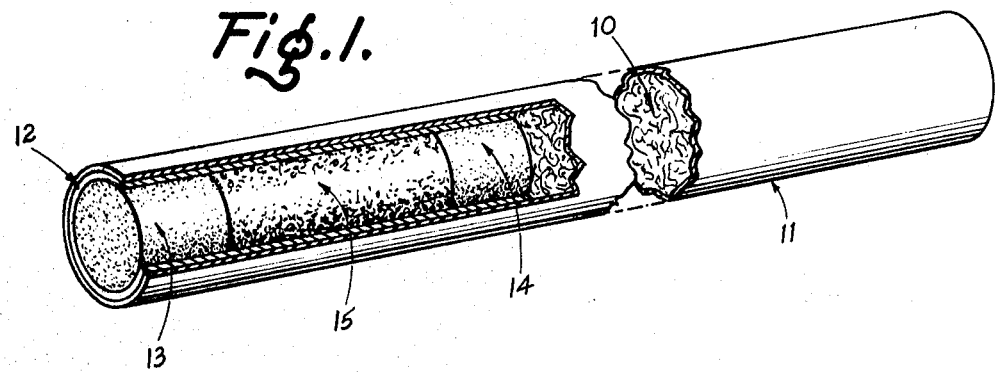

United States Patent

Clark

[15] 3,662,765
[45] May 16, 1972

[54] SMOKE FILTER

[72] Inventor: Robert F. Clark, Schenectady, N.Y.

[73] Assignee: General Electric Company

[22] Filed: Nov. 27, 1970

[21] Appl. No.: 93,504

Related U.S. Application Data

[63] Continuation of Ser. No. 749,380, Aug. 1, 1968, abandoned.

[52] U.S. Cl..............................131/265, 55/522, 260/46.5 E, 260/46.5 Y, 260/46.5 R, 260/37 SB, 260/2.5 S, 260/2.5 R, 260/2.5 A, 131/269
[51] Int. Cl..................................A24b 15/02, B01d 39/00
[58] Field of Search.............................131/264–269; 55/528, 522; 260/37 SB, 2.5 S, 2.5 R, 2.5 A, 46.5 E, 46.5 Y, 46.5 R

[56] References Cited

UNITED STATES PATENTS

| | | | |
|---|---|---|---|
| 3,026,278 | 3/1962 | Walton et al. | 260/18 |
| 3,032,445 | 5/1962 | Hamon | 131/269 X |
| 3,050,492 | 8/1962 | Polmanteer et al. | 260/37 |
| 3,070,555 | 12/1962 | Bruner | 260/2.5 |
| 3,185,663 | 5/1965 | Prober | 260/46.5 |
| 3,347,245 | 10/1967 | Hawkins | 131/262 X |
| 3,360,538 | 12/1967 | Ashby | 260/448.2 |
| 3,379,659 | 4/1968 | Murphy | 260/2.5 |

FOREIGN PATENTS OR APPLICATIONS

| | | | |
|---|---|---|---|
| 721,162 | 12/1954 | Great Britain | 131/267 |
| 753,203 | 7/1956 | Great Britain | 131/265 |
| 1,065,312 | 9/1959 | Germany | 131/267 |
| 908,185 | 10/1962 | Great Britain | 10.5/ |

*Primary Examiner*—Melvin D. Rein

[57] ABSTRACT

A porous filter is provided which is effective for removing undesirable materials such as particulate matter from smoke, including tobacco smoke, comprising an organopolysiloxane disposed in the conduit through which the smoke is forced to pass, the said filter being formed of an organopolysiloxane of the formula:

$$(R)_a(R)_b SiO(4-a-b)/2$$

Where R is a monovalent polar organic radical selected from the group consisting of cyanalkyl, fluoroalkyl, nitroalkyl, arylsulfonylalkyl, carbamylalkyl, carbalkoxyl, uriedoalkyl and nitroaryl, R' is a monovalent hydrocarbon radical, $a$ has a value equal to 0.1 to 3, inclusive, $b$ has a value of 0 to 2.5 inclusive, and the sum of $a+b$ has a value equal to 1 to 3, inclusive, mixed with up to about 300 parts of filler. The filter can be used in combination with a cigarette, or as an anti-air pollution device. The organopolysiloxane can also be carried on a porous substrate such as polyurethane or polyvinyl chloride.

18 Claims, 4 Drawing Figures

Patented May 16, 1972

3,662,765

Inventor
Robert F. Clark
by William A. Jeoli
His Attorney

SMOKE FILTER

This application is a continuation of application Ser. No. 749,380, filed Aug. 1, 1968, now abandoned.

The present invention relates to a porous filter for removing undesirable materials from smoke comprising an organopolysiloxane having monovalent polar organoradicals attached to silicon, and to a cigarette utilizing such filter.

Prior to the present invention, various means were employed to remove undesirable components from smoke. For example, various filters are employed in combination with cigarettes to remove solids and volatiles from tobacco smoke, to reduce the tendency of such smoke to impair the health of the smoker, stain the smoker's hands and teeth, etc. A variety of tobacco smoke filters are available in the form of mechanical structures, finely divided absorbent materials, chemicals, etc. Although some tobacco smoke filters have been found to be selective for removing particular volatile components, such as metallic carbonyls, from tobacco smoke, a more effective filter for removing particulate matter is required. The term "particulate matter" when employed hereinafter in the description of the present invention can signify solid and volatile materials carried by smoke.

The present invention is based on the discovery that a highly effective porous filter capable of removing particulate matter from smoke, can be made utilizing an organopolysiloxane having monovalent polar organoradicals attached to silicon by carbon-silicon linkages. The filter provided by the present invention can be employed as an anti-air pollution device such as on automobile exhausts, smoke stacks, air conditioner intakes, etc, in addition to its use with cigarettes.

FIG. 1 is a perspective view of a cigarette incorporating an embodiment of the invention. Such cigarette, for example, can have an overall length of 85 mm., including a tobacco portion 10, wrapped in paper 11, and a filter overwrap section 12, which can be 25 mm. The filter portion can incorporate porous plugs 13 and 14 with the organopolysiloxane polymer 15, in a particulate form utilizing a finely divided carrier. In addition, as described hereinafter, the filter element of the cigarette of FIG. 1 can employ a porous organopolysiloxane foam in place of the organopolysiloxane in particulate form at 15, or an organic foam, for example, a polyvinyl chloride, polyurethane, etc., which has been treated with the organopolysiloxane polymer in accordance with the practice of the invention.

Figure 2:
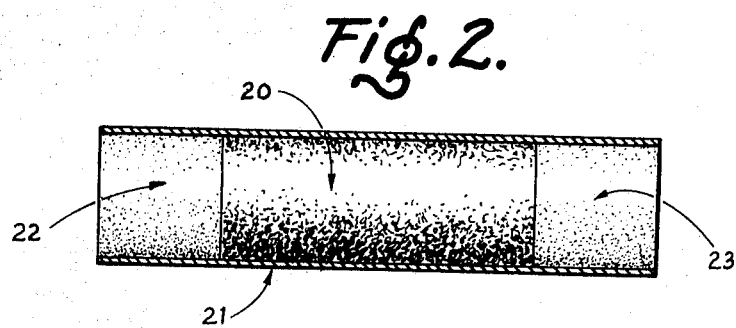

As shown by FIG. 2, the porous filter of the present invention can be in the form of a cartridge filter assembly containing the organopolysiloxane 20, in a particulate form on a finely divided carrier. This cartridge filter assembly can be inserted into pipes, cigarette holders, or anti-air pollution devices. It consists of a tube 21 of paper, plastic material, or metal fitted at each end with plugs 22 and 23 of porous material such as cellulose acetate, or foam material such as polyurethane, polystyrene, polyvinyl chloride, organopolysiloxane, etc.

Figure 3:
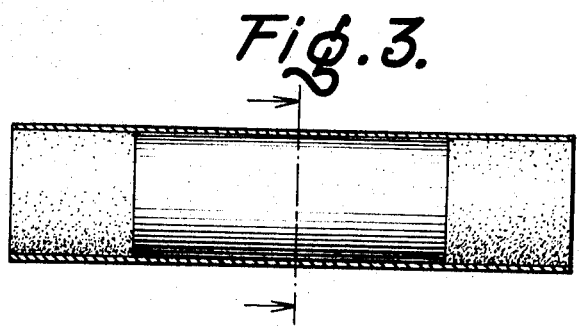
Figure 4:
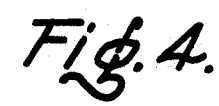

FIG. 3 shows the cartridge filter assembly containing the organopolysiloxane in the form of a foam, or an organic foam treated with the organopolysiloxane. FIG. 4 is a cross section of the foam in FIG. 3.

There is provided by the present invention, a porous filter capable of removing particulate matter from smoke comprising (A) 100 parts of an organopolysiloxane of the formula:

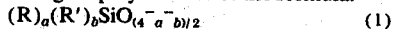

$$(R)_a(R')_b SiO_{(4-a-b)/2} \qquad (1)$$

and (B) 0 to 300 parts of filler, where R is a monovalent polar organoradical, R' is a monovalent hydrocarbon radical, $a$ has a value equal to 0.1 to 3 inclusive, $b$ has a value equal to 0 to 2.5 inclusive, and the sum of $a + b$ has a value equal to 1 to 3 inclusive.

Radicals included by R of Formula (1) are for example, polar radicals such as cyanoalkyl fluoroalkyl, nitroalkyl, arylsulfonylalkyl, carbamylalkyl, carbalkoxyalkyl, uriedoalkyl, nitroaryl. Preferably, R is cyanoalkyl such as cyanoethyl, cyanopropyl, cyanobutyl, etc. In addition, R can be nitrophenyl, nitrotolyl, trifluoropropyl, 3,3,4,4-tetrafluorobutyl, carbamylaminoethyl, phenylsulfonylpropyl, etc. Radicals included by R' are aryl radicals, such as phenyl, tolyl, xylyl, naphthyl, etc.; aralkyl, such as benzyl, phenylethyl, etc.; alkyl radicals, such as methyl, ethyl, propyl, butyl, pentyl, etc.; alkenyl radicals, such as vinyl, allyl, 1-butenyl, etc.; alkynyl radicals, such as ethynyl, propynyl, butynyl, etc.

The porous filter of the present invention comprising the organopolysiloxane of Formula (1) can be employed in particulate form when utilized in combination with a finely divided carrier, such as a silica filler, diatomaceous earth, carbon black, powdered cellulose acetate, etc. The porous filter of the present invention also can be utilized in the form of a foam of the organopolysiloxane of Formula (1). Additionally, the porous filter of the present invention can be in the form of a treated porous structure, such as a cotton, organic foams, referred to above such as polyurethane foam, etc., by contacting such structure with the organopolysiloxane of Formula (1) in liquid or gaseous form, or in the form of an organic solvent solution.

The organopolysiloxanes of Formula (1) include for example, resins, gums, and fluids having cyanoalkyl radicals attached to silicon. Such cyanoalkylpolysiloxanes are shown for example, by Prober, U.S. Pat. No. 3,185,663 assigned to the same assignee as the present invention. Some of the cyanoalkylpolysiloxanes can be made by equilibration of organocyclopolysiloxanes, such as octamethylcyclotetrasiloxane with cyanoalkylpolysiloxane, such as 2,4,6,8-tetra-methyl-2,4,6,8-tetra-beta-cyanoethylcyclotetrasiloxane. In addition, these cyanoalkylpolysiloxanes can be made by cohydrolyzing organochlorosilanes, such as dimethyldichlorosilane with organocyanoalkylsilanes, such as methyl-beta-cyanoethyldichlorosilane.

The preferred organopolysiloxane of the present invention are organopolysiloxane gums having from 1.95 to 2.01 organoradicals attached to silicon by carbon-silicon linkage selected from cyanoalkyl radicals and a mixture of cyanoalkyl radicals and monovalent hydrocarbon radicals such as methyl radicals, phenyl radicals and vinyl radicals. These organopolysiloxanes can have intrinsic viscosities in methylethyl ketone at 25° C of from about 0.5 to about 2. These cyanoalkylpolysiloxanes can consist of from about 10 to 100 mole per cent of chemically combined cyanoalkyl substituted siloxy units, having at least one and up to three cyanoalkyl radicals, such as $\beta$-cyanoethyl radicals or $\gamma$-cyanopropyl radicals attached to silicon while the balance of the radicals are preferably selected from methyl, a mixture of methyl and phenyl, a mixture of vinyl and methyl and a mixture of methyl, vinyl and phenyl. These polydiorganosiloxanes can have terminal silanol radicals, triorganosiloxy units which can be substituted with either cyanoalkyl radicals and the aforementioned monovalent hydrocarbon radicals previously recited, or a mixture thereof, or a mixture of silanol and such triorganosiloxy units.

In addition to the aforementioned essentially linear cyanoalkylpolysiloxanes consisting essentially of chemically combined organocyanoalkylsiloxy units and diorganosiloxy units, there also can be utilized in the practice of the present invention cyanoalkylsiloxane copolymers in the form of resinous materials as shown by Walton et al., U.S. Pat. No. 3,026,278. Some of the nitroarylsiloxanes which can be employed in the practice of the invention are shown by Bailey et al., U.S. Pat. No. 3,375,318. Typical of the fluoroalkylsiloxanes which can be utilized in the practice of the invention are the tetrafluorobutyl-substituted siloxanes taught by Ashby, assigned to the same assignee as the present invention. Further examples of the fluoroalkylsiloxanes which can be utilized in the practice of the invention are shown by Polmanteer et al., U.S. Pat. No. 3,050,492.

The preparation of the porous filter of the present invention in the form of finely divided powder comprising the organopolysiloxane polymer of Formula (1) and a filler, such as a silica filler, can be achieved by means known to the art. For example, a cyanoalkylpolysiloxane polymer having an average ratio of about two organoradicals per silicon atom and a viscosity of at least 100,000 centipoises at 25° C having from 10 to 100 mole per cent chemically combined cyanoalkylsiloxy units, such as beta-cyanoethylsiloxy units chemically combined with from 0 to 90 mole per cent of organosiloxy units, such as methylsiloxy or phenylsiloxy units, can be blended with a suitable filler. Suitable fillers include for example, reinforcing and semi-reinforcing fillers. Reinforcing fillers include for example, silica fillers such as fume silica, precipitated silica, silica aerogel, etc. Semi-reinforcing fillers include diatomaceous earth, perlite, ground quartz, etc. A proportion of from 20 to 75 parts of reinforcing filler can be utilized while up to 300 parts of semi-reinforcing filler, either alone or in combination with reinforcing filler, will provide for effective results. The preferred porous filter of the invention is a blend of an organopolysiloxane gum and a silica filler. A proportion of from 20 to 75 parts of filler and from 0 to 20 parts of process aid such as silylamine, silazane, etc. can be used. Blending is preferably achieved while using an inert gas purge, such as a nitrogen purge. Preferably, 6 to 12 parts of process aid per 100 parts of polymer can be employed. The mixture then can be heated for one-half to 10 hours at a temperature between 75° to 200° C.

In the event the cyanoalkylsiloxane is in the form of a fluid or resin, an organic solvent solution of the cyanoalkylsiloxane can be employed to treat various finely divided substrates, such as silica fillers, finely divided clays, carbon blacks, polyethylene, etc. Treatment also can be achieved by solvent spray, slurry or immersion techniques or with direct contact with the organopolysiloxane vapor, if feasible. Similar techniques can be used to prepare the porous filter of the present invention with the organopolysiloxane of Formula (1), substituted with other polar radicals, such as nitroaryl radicals, fluoroalkyl radicals, etc.

The organopolysiloxane polymer of Formula (1) also can be utilized in the practice of the invention in the form of a foam. Methods for making such foam are shown in U.S. Pat. No. 3,379,659 — Murphy assigned to the same assignee as the present invention, and Bruner, U.S. Pat. No. 3,070,555. Murphy teaches for example, that a cyanoalkylsiloxane foam can be made from a mixture of a cyanoalkylsiloxane polymer, an aminoxysilane, and a siloxane hydride, by contacting the mixture with atmospheric moisture while it is stirred at 25° C. Organopolysiloxane foams also can be made by heating organopolysiloxane elastomer compositions with a blowing agent, such as N,N-dinitroso-N,N-dimethylterephthalamide.

In addition to utilizing the organopolysiloxane of Formula (1) in particulate form, or in the form of a foam, porous substrates, such as polyvinyl chloride foams, polyurethane foams, cotton, etc. can be treated with the organopolysiloxane. The organopolysiloxane can be employed as a liquid or organic solvent solution. A suitable organic solvent is one which does not impair the porosity of the substrate, while providing for the dispersion of the organopolysiloxane through the fibers or pores of the porous substrate. Some of the organic solvents which can be employed are for example, acetone, methylethyl ketone, ethyl acetate, etc.

In order that those skilled in the art will be better able to practice the invention, the following examples are given by way of illustration and not by way of limitation. All parts are by weight.

EXAMPLE 1

A porous organopolysiloxane powder was made by milling together 35 parts of a silica aerogel and 100 parts of a silanol containing organopolysiloxane polymer having terminal trimethylsiloxy units and composed of about 50 mole per cent of methyl-beta-cyanoethylsiloxy chemically combined with about 50 mole per cent of dimethylsiloxy units. During the milling of the polymer and the filler there was added 8 parts of hexamethylcyclotrisilazane. The mixture was agitated in a dough-mixer at room temperature under a nitrogen atmosphere. The batch was then cooked for 4 hours at about 160° C utilizing a nitrogen purge. There was obtained a finely divided snow-white powder.

Several cigarettes having a cellulose acetate filter as described in Spear et al., U.S. Pat. No. 3,246,655 were machine smoked for an average of about 4 minutes utilizing an open end manometer at a partial pressure of from 10 mm. to 35 mm. Torr. The smoke was continuously passed into acetone. When a length of 50 mm. was completely consumed, the acetone was evaporated. The weight of particulate matter derived from the smoke was measured.

An equivalent number of the above cellulose acetate filter cigarettes were altered by severing the overwrap and removing a 5 mm. section from the middle of the cellulose acetate filters of each of the cigarettes. Each of the filter chambers resulting from the respective cigarettes were filled with about 0.1 g. of the above porous beta-cyanoethylsiloxane powders. The overwrap on each of the filters was then taped with a pressure sensitive adhesive tape. The cigarettes were then machine smoked and the particulate matter from each of the cigarettes was measured in accordance with the above procedure.

The following table shows the results obtained, where the weight of particulate matter passed through the filter is shown in mg and powder indicates the organopolysiloxane in particulate form:

| Powder | Particulate Matter |
| --- | --- |
| Yes | 4.4 |
| No | 13.4 |

EXAMPLE 2

An organopolysiloxane foam having beta-cyanoethyl radicals attached to silicon is prepared in accordance with the teaching of U.S. Pat. No. 3,379,659 — Murphy.

One hundred parts of a silanol-terminated organopolysiloxane composed of about 50 mole per cent of dimethylsiloxy units chemically combined with about 50 mole per cent of beta-cyanoethylsiloxy units having a viscosity of about 50,000 centipoises at 25° C, is mixed under substantially anhydrous conditions with methyl-tris-(N,N-diethylaminoxy)-silane, 20 parts of fume silica and a siloxane hydride having a viscosity of about 20 centipoises at 25° C. The siloxane hydride consists essentially of chemically combined methylhydrogensiloxy units and terminated with trimethylsiloxy units. The ratio of N,N-diethylaminoxy radicals to silanol radicals in the resulting mixture is about 8.5 to 1. The mixture is allowed to contact the atmosphere while being stirred. A cured foam having a density of about 0.2 g per cc is obtained after 6 to 8 hours. A cylindrical plug having about an 8 mm. diameter and 20 mm. length is cut from the foamed mass.

Following the procedure of Example 1, a 10 mm. section of the cellulose acetate filter is removed from several cigarettes and replaced with an equivalent volume of the above foam. The cigarettes are then machine smoked until 50 mm. is consumed. It is found that the average weight of particulate matter derived from the smoke of cigarettes containing the plug of $\beta$-cyanoethylsiloxy foam is substantially less than 13.4 mg.

EXAMPLE 3

A polyurethane plug having about an 8 mm. diameter and a 20 mm. length and a volume weight of about 40 Kg/M³, is immersed for several hours at room temperature in a 50 per cent by weight methylethyl ketone solution of a $\beta$-cyanoethylsiloxane fluid. The $\beta$-cyanoethylsiloxane fluid consists of about 66 ⅔ mole per cent of $\beta$-cyanoethylsiloxy units chemically combined with about 33 ⅓ mole per cent dimethylsiloxy units and chain-stopped with trimethylsiloxy units. The treated filter is allowed to air dry under atmospheric conditions for 4 hours and then cut into several 10 mm. plugs.

The procedure of Example 2 is repeated except that in place of the plugs of organopolysiloxane, polyurethane plugs are inserted into the 10 mm. spaces of the cellulose acetate filters. It is found that the average amount of particulate matter passed by the machine smoked cigarettes containing the treated polyurethane plugs is substantially less than 13.4 mg.

EXAMPLE 4

An organopolysiloxane oil having a molecular weight of 3,500 and a mixture of meta-nitrophenyl radicals and methyl radicals attached to silicon is prepared in accordance with the teaching of Bailey et al., U.S. Pat. No. 3,375,218. There is equilibrated a mixture of 31.2 parts of meta-nitrophenyl, hepta-methylcyclo-tetrasiloxane, 3.8 parts of dodecamethyl-tetrasiloxane and 0.175 parts of concentrated sulphuric acid. The mixture is then allowed to stand for several hours at ambient temperatures, washed, dried and filtered. The mixture is then stripped.

A cylindrical polyvinyl foam plug having a volume weight of about 40 Kg/M³ and dimensions of about 8 mm. × 20 mm. is immersed into a 50 per cent by weight ethyl acetate solution of the above meta-nitrophenyl siloxane. After 4 hours the polyvinyl chloride plug is removed and allowed to air dry. It is cut into several 10 mm. plugs. The procedure of Example 2 is repeated, except the meta-nitrophenylsiloxane polyvinyl treated foam plug is used in place of the organopolysiloxane foam plug. It is found that the cigarettes containing the meta-nitrophenylsiloxane plugs pass considerably less than 13.4 mg of particulate matter after they are machine smoked by the above described test procedure.

EXAMPLE 5

A porous organopolysiloxane powder is made in accordance with the method of Example 1, except that in place of the beta-cyanoethylsiloxane polymer, there is employed an organopolysiloxane polymer composed of about 50 mole per cent of methyltetrafluorobutylsiloxy units chemically combined with about 50 mole per cent of a mixture of dimethylsiloxy units and methylvinylsiloxy units and terminal trimethylsiloxy units.

The above tetrafluorobutyl-substituted siloxane polymer is made in accordance with the method of Example 7 of U.S. Pat. No. 3,360,538 — Ashby. A mixture of 64 1/2 parts of 2,4,6-tris-(3′,3′,4′,4′-tetrafluorobutyl), 1,3,5-trimethyl-cyclotrisiloxane is equilibrated with 25.5 parts of octamethyl-cyclotetrasiloxane and a minor amount of methylvinylsiloxane utilizing a tetrabutylphosphonate catalyst at a temperature of 105° C. The resulting polymer is thereafter milled with filler and a process aid in accordance with the method of Example 1. A cellulose acetate filter tip cigarette containing about 0.1 gram of the porous tetrafluorobutylsiloxane powder is found to pass substantially less than 13.4 mg of particulate matter when machine smoked by the testing method of Example 1.

Although the foregoing examples have been limited to only a few of the very many variables within the scope of the present invention, it should be understood that the present invention is directed to a much broader class of porous organopolysiloxane filters, in the form of powders, foams and treated porous structures as illustrated in the drawings and the foregoing description preceding these examples.

What I claim as new and desire to secure by Letters Patent of the United States is:

1. A filter for filtering out particulate matter from combustion fumes or smoke passing through a conduit comprising a porous container having a cross-section at least the size of the diameter of said conduit with said container being located at the outlet of said conduit so that the smoke will flow through said container and filter material filling said container which filter material is formed from small particles of an organopolysiloxane of the formula:

$$(R)_a(R')_b SiO_{(4-a-b)/2}$$

where R is a monovalent polar organic radical selected from the group consisting of cyanoalkyl, fluoroalkyl, nitroalkyl, arylsulfonylalkyl, carbamylalkyl, carbalkoxyalkyl, uriedoalkyl and nitroaryl, R' is a monovalent hydrocarbon radical, $a$ has a value equal to 0.1 to 3, inclusive, $b$ has a value of 0 to 2.5, inclusive, and the sum of $a+b$ has a value equal to 1 to 3, inclusive, mixed with up to about 300 parts of filler.

2. A filter for filtering out particulate matter from combustion fumes or smoke passing through a conduit comprising a porous container having a cross-section at least the size of the diameter of said conduit with said container being located at the outlet of said conduit so that the smoke will flow through said container and a filter foam material filling said container which filter foam material is formed from an organopolysiloxane of the formula, $$(R)_a(R')_b SiO_{(4-a-b)/2}$$

where R is a monovalent polar organic radical selected from the group consisting of cyanoalkyl, fluoroalkyl, nitroalkyl, arylsulfonylalkyl, carbamylalkyl, carbalkoxyalkyl, uriedoalkyl and nitroaryl, R' is a monovalent hydrocarbon radical, $a$ has a value equal to 0.1 to 3, inclusive, $b$ has a value of 0 to 2.5, inclusive, and the sum of $a+b$ has a value equal to 1 to 3, inclusive, mixed with up to about 300 parts of filler and a process aid.

3. A filter for filtering out particulate matter from combustion fumes or smoke passing through a conduit comprising a porous foam substrate having a cross-section at least the size of the diameter of said conduit with said substrate being located at the outlet of said conduit so that the smoke will flow through said substrate which substrate is treated with an organopolysiloxane of the formula:

$$(R)_a(R')_b SiO_{(4-a-b)/2}$$

where R is a monovalent polar organic radical selected from the group consisting of cyanoalkyl, fluoroalkyl, nitroalkyl, arylsulfonylalkyl, carbamylalkyl, carbalkoxyalkyl, and nitroaryl, R' is a monovalent hydrocarbon radical, $a$ has a value equal to 0.1 to 3, inclusive, $b$ has a value of 0 to 2.5, inclusive, and the sum of $a+b$ has a value equal to 1 to 3, inclusive.

4. A filter for filtering out particulate matter from tobacco smoke comprising a cylindrical tube having about the diameter of a cigarette filled with small particles formed from an organopolysiloxane of the formula:

$$(R)_a(R')_b SiO_{(4-a-b)/2}$$

where R is a monovalent polar organic radical selected from the group consisting of cyanoalkyl, fluoroalkyl, nitroalkyl, arylsulfonylalkyl, carbamylalkyl, carbalkoxyalkyl, uriedoalkyl and nitroaryl, R' is a monovalent hydrocarbon radical, $a$ has a value equal to 0.1 to 3, inclusive, $b$ has a value of 0 to 2.5, inclusive, and the sum of $a+b$ has a value equal to 1 to 3, inclusive, mixed with up to about 300 parts of filler.

5. A filter for filtering out particulate matter from tobacco smoke comprising a cylindrical tube having about the diameter of a cigarette filled with a cylindrical rod of foam material formed from an organopolysiloxane of the formula:

$$(R)_a(R')_b SiO_{(4-a-b)/2}$$

where R is a monovalent polar organic radical selected from the group consisting of cyanoalkyl, fluoroalkyl, nitroalkyl, arylsulfonylalkyl, carbamylalkyl, carbalkoxyalkyl, uriedoalkyl and nitroaryl, R' is a monovalent hydrocarbon radical, $a$ has a value equal to 0.1 to 3, inclusive, $b$ has a value of 0 to 2.5, inclusive, and the sum of $a+b$ has a value equal to 1 to 3, inclusive, mixed with up to about 300 parts of filler and a process aid.

6. A filter for filtering out particulate matter from tobacco smoke comprising a cylindrical tube having about the diameter of a cigarette filled with a cylindrical rod constructed from a porous foam substrate which rod is treated with an organopolysiloxane of the formula:

$$(R)_a(R')_b SiO_{(4-a-b)/2}$$

where R is a monovalent polar organic radical selected from the group consisting of cyanoalkyl, fluoroalkyl, nitroalkyl, arylsulfonylalkyl, carbamylalkyl, carbalkoxyalkyl and nitroaryl, R' is a monovalent hydrocarbon radical, $a$ has a value equal to 0.1 to 3, inclusive, $b$ has a value of 0 to 2.5, inclusive, and the sum of $a + b$ has a value equal to 1 to 3, inclusive.

7. A process for removing particulate matter from tobacco smoke comprising placing adjacent an amount of tobacco particles having two ends such that one end is burning, a porous filter with two ends which contains therein an organopolysiloxane of the formula:

$$(R)_a(R')_b SiO_{(4-a-b)/2}$$

where R is a monovalent polar organic radical selected from the group consisting of cyanoalkyl, fluoroalkyl, nitroalkyl, arylsulfonylalkyl, carbamylalkyl, carbalkoxyalkyl and nitroaryl, R' is a monovalent hydrocarbon radical, $a$ has a value equal to 0.1 to 3, inclusive, $b$ has a value of 0 to 2.5, inclusive, and the sum of $a + b$ has a value equal to 1 to 3, inclusive, and applying suctions to one end of said filter which is away from said tobacco so as to draw the tobacco smoke through said filter.

8. The process of claim 7 wherein the filter comprises a cylindrical tube which is filled with particles formed from a mixture of said organopolysiloxane and up to about 300 parts filler.

9. The process of claim 7 wherein the filter comprises a cylindrical tube which is filled with a porous foam constructed from said organopolysiloxane, up to about 300 parts of filler and a process aid.

10. The process of claim 8 wherein said organopolysiloxane consists essentially of beta-cyanoethylsiloxy units and dimethylsiloxy units.

11. The process of claim 8 wherein said particles are formed from a blend of 100 parts of beta-cyanoethylsiloxane composed of about 50 mole per cent of chemically combined beta-cyanoethyl, methylsiloxy units and about 50 mole per cent of dimethylsiloxy units and 75 parts of silica filler.

12. The process of claim 7 wherein the filter comprises a cylindrical tube which is filled with a rod constructed from a porous substrate selected from the group consisting of polyurethane and polyvinylchloride and which is treated with said organopolysiloxane.

13. A process for removing particulate matter from smoke comprising placing in the path of said smoke a filter which contains therein an organopolysiloxane of the formula:

$$(R)_a(R')_b SiO_{(4-a-b)/2}$$

where R is a monovalent polar organic radical selected from the group consisting of cyanoalkyl, fluoroalkyl, nitroalkyl, arylsulfonylalkyl, carbamylalkyl, carbalkoxyalkyl, and nitroaryl, R' is a monovalent hydrocarbon radical, $a$ has a value equal to 0.1 to 3, inclusive, $b$ has a value of 0 to 2.5, inclusive, and the sum of $a + b$ has a value of equal to 1 to 3, inclusive.

14. The process of claim 13 wherein the filter comprises a cylindrical tube which is filled with particles formed from a mixture of said organopolysiloxane and up to about 300 parts of filler.

15. The process of claim 13 wherein the filter comprises a cylindrical tube which is filled with a porous foam constructed from said organopolysiloxane, up to about 300 parts of filler and a process aid.

16. The process of claim 14 wherein said organopolysiloxane consists essentially of beta-cyanoethylsiloxy units and dimethylsiloxy units.

17. The process of claim 14 wherein said particles are formed from a blend of 100 parts of beta-cyanoethylsiloxane composed of about 50 mole per cent of chemically combined beta-cyanoethyl, methylsiloxy units and about 50 mole per cent of dimethylsiloxy units and 35 parts of silica filler.

18. The process of claim 13 wherein the filter comprises a cylindrical tube which is filled with a rod constructed from a porous substrate selected from the group consisting of polyurethane and polyvinylchloride and which substrate is treated with said organopolysiloxane.

* * * * *